(12) United States Patent  
Ellery et al.

(10) Patent No.: US 8,952,841 B1  
(45) Date of Patent: Feb. 10, 2015

(54) SYSTEM AND METHOD FOR TCAS BASED NAVIGATION

(75) Inventors: Phillip L. Ellery, Melbourne, FL (US); Mark A. Billsberry, Indialantic, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 454 days.

(21) Appl. No.: 13/349,975

(22) Filed: Jan. 13, 2012

(51) Int. Cl.  
*G01S 13/93* (2006.01)  
*G01S 13/48* (2006.01)  
*G01S 13/75* (2006.01)  
*G01S 13/00* (2006.01)

(52) U.S. Cl.  
USPC ............... 342/107; 342/29; 342/30; 342/104; 342/117; 342/118; 342/120; 342/146; 342/147; 342/175; 342/195

(58) Field of Classification Search  
USPC ............ 342/29–40, 59, 118, 120–122, 342/25 R–25 F, 73–76, 104, 107, 117, 165, 342/173–175, 195, 350, 385, 417, 442, 450, 342/454, 455, 105, 106, 108–116, 146–157  
See application file for complete search history.

(56) References Cited

U.S. PATENT DOCUMENTS

| | | | | |
|---|---|---|---|---|
| 2,857,590 A | * | 10/1958 | Berger | 342/76 |
| 2,865,020 A | * | 12/1958 | Wolinsky | 342/117 |
| 2,866,190 A | * | 12/1958 | Berger | 342/59 |
| 2,994,865 A | * | 8/1961 | Scism et al. | 342/76 |
| 3,137,848 A | * | 6/1964 | May | 342/76 |
| 3,184,736 A | * | 5/1965 | Badewitz | 342/120 |
| 3,243,809 A | * | 3/1966 | Hughey et al. | 342/76 |
| 3,270,341 A | * | 8/1966 | Sirons | 342/107 |
| 3,334,344 A | * | 8/1967 | Colby, Jr. | 342/120 |
| 3,719,923 A | * | 3/1973 | Waterman | 342/107 |
| 4,023,171 A | * | 5/1977 | Stavis | 342/120 |
| 4,103,302 A | * | 7/1978 | Roeder et al. | 342/117 |
| 4,855,748 A | * | 8/1989 | Brandao et al. | 342/455 |
| 5,045,855 A | * | 9/1991 | Moreira | 342/25 A |
| 5,109,230 A | * | 4/1992 | Hassenpflug | 342/120 |
| 5,327,140 A | * | 7/1994 | Buckreubeta | 342/25 A |
| 5,627,543 A | * | 5/1997 | Moreira | 342/25 A |
| 5,629,692 A | * | 5/1997 | Stayton et al. | 342/174 |
| 5,923,281 A | * | 7/1999 | Vopat | 342/117 |
| 6,169,519 B1 | * | 1/2001 | Holecek et al. | 342/442 |
| 6,208,284 B1 | * | 3/2001 | Woodell et al. | 342/30 |
| 6,285,313 B1 | * | 9/2001 | Wahab et al. | 342/174 |

(Continued)

*Primary Examiner* — Bernarr Gregory  
(74) *Attorney, Agent, or Firm* — Angel N. Gerdzhikov; Donna P. Suchy; Daniel M. Barbieri

(57) ABSTRACT

A traffic collision avoidance system (TCAS) based navigation system including a TCAS equipped with a directional antenna, the TCAS configured to generate a RF transmission pattern at a selected frequency, the transmission pattern including a plurality of directional beams, receive a plurality of RF signals reflected from the ground across a selected frequency band, the selected frequency band including the selected frequency, and measure frequency differences between one or more beams of the plurality of RF beams and one or more beams of the plurality of RF signals reflected from the ground, and a computing systems in communication with the TCAS, the computing system configured to calculate a ground speed of the aircraft utilizing the measured frequency differences, calculate a drift angle of the aircraft utilizing the measured plurality of frequency differences, receive a heading reference of the aircraft, and determine an aircraft navigation parameter of the aircraft.

21 Claims, 6 Drawing Sheets

(56) References Cited

U.S. PATENT DOCUMENTS

| | | | |
|---|---|---|---|
| 6,392,598 B1 * | 5/2002 | Jones et al. | 342/442 |
| 6,593,875 B2 * | 7/2003 | Bergin et al. | 342/121 |
| 6,683,541 B2 * | 1/2004 | Staggs et al. | 342/29 |
| 7,116,266 B1 * | 10/2006 | Vesel et al. | 342/30 |
| 7,436,350 B1 * | 10/2008 | Maloratsky et al. | 342/30 |
| 7,492,307 B2 * | 2/2009 | Coulmeau | 342/32 |
| 7,724,178 B2 * | 5/2010 | Brandao et al. | 342/29 |
| 8,373,591 B2 * | 2/2013 | Margolin | 342/30 |
| 8,643,534 B2 * | 2/2014 | Margolin | 342/30 |

\* cited by examiner

SYSTEM AND METHOD FOR TCAS BASED NAVIGATION

TECHNICAL FIELD

The present invention generally relates to a method and system for aircraft navigation, particularly a navigation system and method implemented via a traffic collision avoidance system (TCAS).

BACKGROUND

Civilian and military aircraft currently utilize a variety of systems to provide aircraft navigation capabilities. Satellite based global position systems (GPS) represent the most commonly implemented navigation support system and are utilized ubiquitously throughout aviation. Due to the existence of intermittent GPS malfunction, it is desirable to provide additional navigation systems. Various other types of systems have been implemented in the known art in order to provide stand alone navigation capabilities as well as navigation backup functions for associated GPS systems. Such auxiliary navigation systems may include, for example, inertial based navigations systems (INS) and weather radar. Both of these systems, however, carry with them undesirable aspects. For example, INS based navigation systems are typically quite expensive. In addition, weather radar based navigation systems are often unavailable and are susceptible to reduced performance due to weather conditions. It is therefore desirable to produce a navigation and GPS backup system utilizing one or more aircraft system(s) that are readily available and which obviate the shortcomings of the known art.

SUMMARY

A traffic collision avoidance system based navigation system is disclosed. In one aspect, the system may include, but is not limited to, a traffic collision avoidance system (TCAS) associated with an aircraft, the TCAS including one or more directional antennas, the TCAS configured to: generate a radio frequency (RF) transmission pattern at a selected frequency, the transmission pattern including a plurality of RF beams, each RF beam being directed to a different region of the ground; receive a plurality of RF signals reflected from the ground across a selected frequency band, the selected frequency band including the selected frequency; and measure a plurality of frequency differences, the plurality of frequency differences including at least a frequency difference between each of the plurality of RF beams and the plurality of reflected RF signals; and one or more computing systems in communication with the TCAS, the one or more computing systems configured to: calculate a ground speed of the aircraft utilizing one or more of the measured plurality of frequency differences; calculate a drift angle of the aircraft utilizing one or more of the measured plurality of frequency differences; receive a heading reference of the aircraft; and determine one or more aircraft navigation parameters of the aircraft utilizing at least one of the calculated ground speed of the aircraft, the calculated drift angle of the aircraft, or the received heading reference of the aircraft.

In another aspect, the system may include, but is not limited to, a traffic collision avoidance system (TCAS) associated with an aircraft, the TCAS including one or more directional antennas, the TCAS configured to: generate a radio frequency (RF) transmission pattern at a selected frequency, the transmission pattern including at least a first RF beam transmitted along a first direction toward a first region of the ground, a second RF beam transmitted along a second direction toward a second region of the ground, a third RF beam transmitted along a third direction toward a third region of the ground, and a fourth RF beam transmitted along a fourth direction toward a fourth region of the ground; receive a plurality of RF signals reflected from the ground across a selected frequency band, the selected frequency band including the selected frequency, the plurality of reflected RF signals including a first RF signal reflected from the first region of the ground toward the TCAS along the first direction, a second RF signal reflected from the second region of the ground toward the TCAS along the second direction, a third RF signal reflected from the third region of the ground toward the TCAS along the third direction, and a fourth RF signal reflected from the fourth region of the ground toward the TCAS along the fourth direction; and measure a plurality of frequency differences between one or more beams of the plurality of RF beams and one or more beams of the plurality of RF signals reflected from the ground, the plurality of frequency differences including at least a frequency difference between the first transmitted RF beam and the first reflected RF signal, a frequency difference between the second transmitted RF beam and the first reflected RF signal, a frequency difference between the third transmitted RF beam and the third reflected RF signal, and a frequency difference between the fourth transmitted RF beam and the fourth reflected RF signal; and one or more computing systems in communication with the TCAS, the one or more computing systems configured to: calculate a ground speed of the aircraft utilizing one or more of the measured plurality of frequency differences; calculate a drift angle of the aircraft utilizing one or more of the measured plurality of frequency differences; receive a heading reference of the aircraft; and determine one or more aircraft navigation parameters of the aircraft utilizing at least one of the calculated ground speed of the aircraft, the calculated drift angle of the aircraft, or the received heading reference of the aircraft.

A method of TCAS based navigation is disclosed. In one aspect, the method may include, but is not limited to, generating a TCAS radio frequency (RF) transmission pattern including a plurality of transmitted TCAS RF beams, each of the RF beams transmitted at a selected frequency, each of the transmitted TCAS RF beams directed toward a different region of the ground; receiving a plurality of TCAS RF signals reflected from the ground across a selected frequency band, the selected frequency band including the selected frequency; measuring a plurality of frequency differences, the plurality of frequency differences including at least a frequency difference between a first transmitted TCAS RF beam and a first reflected TCAS RF signal, a frequency difference between a second transmitted TCAS RF beam and a second reflected TCAS RF signal, a frequency difference between a third transmitted TCAS RF beam and a third reflected TCAS RF signal, and a frequency difference between a fourth transmitted TCAS RF beam and a fourth reflected TCAS RF signal; calculating a ground speed of the aircraft utilizing one or more of the measured plurality of frequency differences; calculating a drift angle of the aircraft utilizing one or more of the measured plurality of frequency differences; receiving a heading reference of the aircraft; and determining one or more aircraft navigation parameters of the aircraft utilizing at least one of the calculated ground speed of the aircraft, the calculated drift angle of the aircraft, or the received heading reference of the aircraft.

BRIEF DESCRIPTION OF THE DRAWINGS

The numerous advantages of the disclosure may be better understood by those skilled in the art by reference to the accompanying figures in which.

DETAILED DESCRIPTION OF THE INVENTION

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention. Reference will now be made in detail to the subject matter disclosed, which is illustrated in the accompanying drawings.

Referring generally to FIGS. 1A through 3 a system 100 suitable for providing traffic collision avoidance system (TCAS) based navigation is described in accordance with the present invention. The present invention is directed toward a modified TCAS system configured to work in combination with a communicatively coupled computing system in order to provide navigation functions (e.g., backup navigation function to GPS systems or cross-check functions to GPS systems) to an aircraft. It is noted herein that TCAS systems are generally utilized by aircraft as proximity alert systems, in which TCAS systems of each nearby aircraft interrogates (e.g., interrogate at 1030 MHz) and provide interrogation responses (e.g., interrogation responses provide at 1090 MHz) to one another. The present invention is further directed at providing a TCAS system capable of transmitting and receiving directional radio frequency signals at substantially the same frequency, allowing the TCAS system to perform Doppler shift measurements along various directions. Utilizing these Doppler shift measurements along the various directions enables the computing system 108 of the present invention to determine various characteristics of an aircraft's flight, such as ground speed and drift angle, which in turn may be used to provide navigation functions to the aircraft.

Figure 1A:
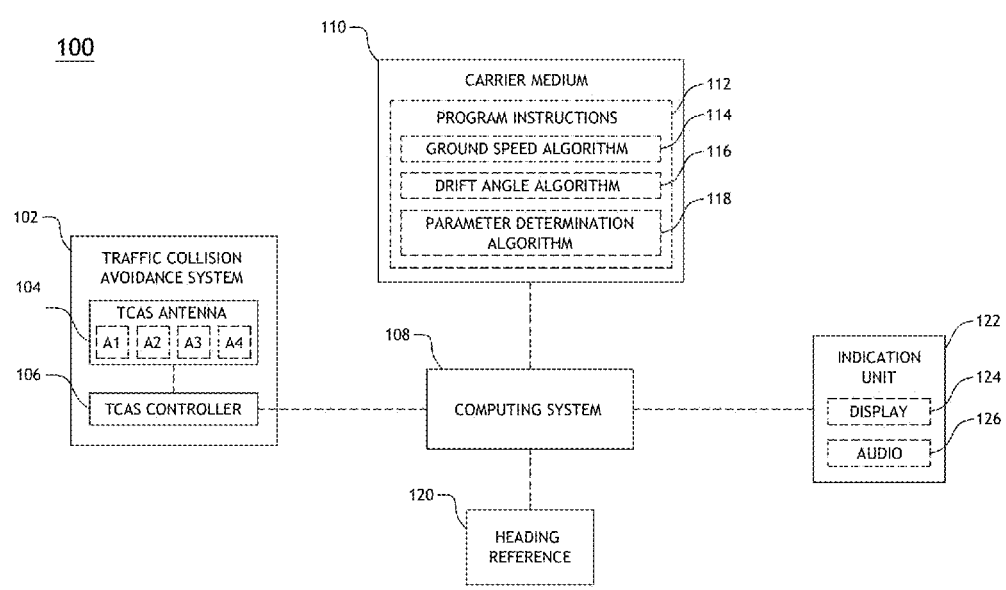
FIG. 1A illustrates a block diagram view of a TCAS based navigation system, in accordance with one embodiment of the present invention.

FIG. 1A illustrates a block diagram view of a traffic collision avoidance system (TCAS) based navigation system 100, in accordance with the present invention. In one aspect, the system 100 may include a TCAS system 102 including one or more directional antennas 104. In another aspect, the directional antenna 104 of the TCAS system 102 may be configured to generate a radio frequency (RF) transmission pattern at a selected frequency (e.g., 1030 MHz). In a further aspect, the RF transmission pattern may include a plurality of RF beams (e.g., four beams), each beam being directed along a different direction. In this manner, each RF beam transmitted from the TCAS system 102 may act to generally impinge on the ground at a different location. In a further aspect, the directional antenna 104 of the TCAS system 102 may be configured to receive a plurality of RF signals reflected from the ground across a selected frequency band (e.g., frequency band spanning 1030 MHz). The TCAS system 102 is further configured to measure a frequency shift (i.e., Doppler shift) between the beams transmitted by the TCAS 102 antenna 104 and the signals reflected by the ground and received by the TCAS 102 antenna 104. In this manner, the TCAS system 102 may measure Doppler shifting of signals along the multiple directions of transmission/reflection. In another aspect, the system 100 may further include a computing system 108 communicatively coupled to the TCAS system 102 and configured to execute at least one of a ground speed calculation algorithm 114 or a drift angle calculation algorithm 116 utilizing the frequency shift measurements (i.e., Doppler shift measurements) provided by the TCAS system 102. The output of the ground speed algorithm 114 and drift angle algorithm 116 may further be combined with a provided heading reference 120 in an aircraft navigation parameter determination algorithm 118 in order to determine one or more aircraft navigation parameters (e.g., present position, course, or distance to destination).

Figure 2A:
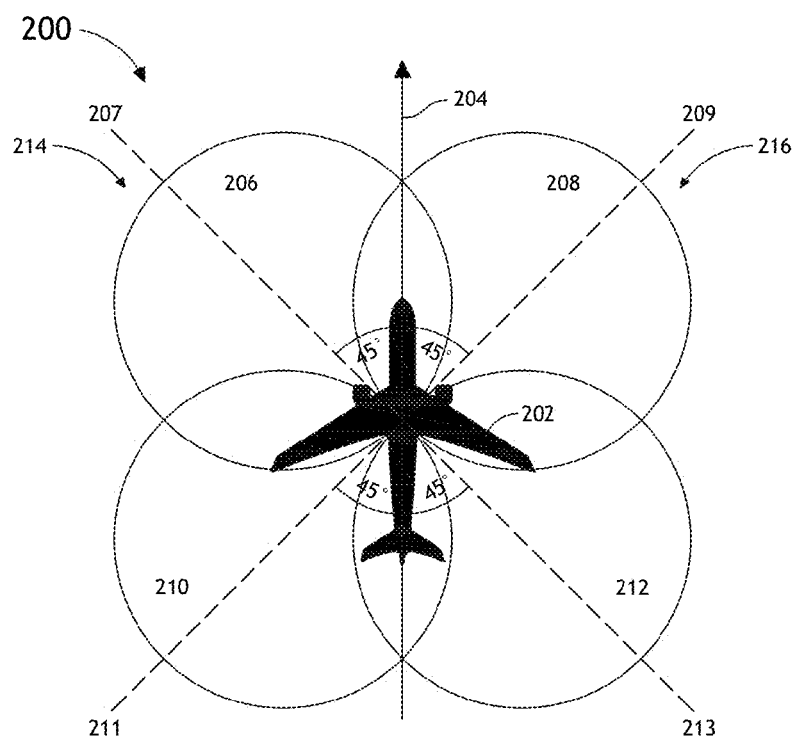
FIG. 2A illustrates a top view of a directional RF beam transmission pattern, in accordance with one embodiment of the present invention.

In a further embodiment of the present invention, the directional antenna 104 of the TCAS 102 includes four antenna elements A1, A2, A3, and A4. It is recognized herein that implementation of a phasing routine of each of the four signals simultaneously emanating from the elements A1 through A4 of the antenna 104 acts to create a directional beam. As shown in FIG. 2A, it is noted herein that the four required beams (e.g., 206, 208, 210, and 212) of the present invention are generally formed individually by the antenna 104 of the TCAS system 102. For example, a beam 208 is transmitted along a direction 209, then beam 210 is transmitted along a direction 211, then beam 206 is transmitted along direction 207, and then beam 212 is transmitted along direction 213 and so on. Applicant notes that the transmission pattern 200 referenced throughout the present disclosure is not produced statically. Rather, the pattern 200 illustrated, for example, in FIG. 2A is a result of a dynamical series of four directional beams appearing and reappearing along the four directions illustrated. The controller 106 of the TCAS system 102 may control the phase relationship of the elements A1-A4 allowing the controller 106 to control the direction of the formed beam.

Figure 1B:
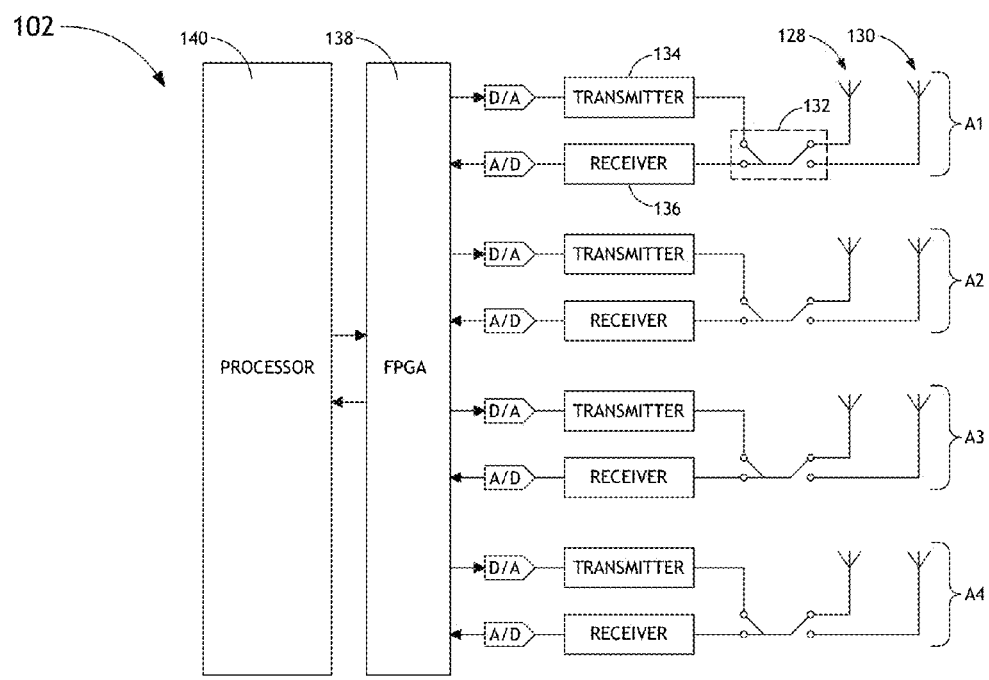
FIG. 1B illustrates a block diagram view of a standard TCAS system, in accordance with one embodiment of the present invention.

FIG. 1B illustrates a block diagram high level view of a standard TCAS system 102. The TCAS 102 is provided merely for illustrate purposes and should not be interpreted in any manner as a limitation as various TCAS configurations may be suitable for implementation in the context of the present invention. The TCAS 102 illustrated in FIG. 1B may include the array elements A1, A2, A3, and A4. In typical configurations, the TCAS 102 may include a top antenna 128 and a bottom antenna 130. It is recognized that, when operating in the navigation configuration of the present invention, the TCAS 102 will likely operate using the bottom antenna 130 as the transmitted signals emanating from the TCAS 102 are directed toward the ground. Further, each antenna element may include a switch coupled to a single antenna and configured to split the transmission 134 and receiving path 136 for downlink and uplink signals. The TCAS 102 may further include a field programmable gate array (FPGA) and the processor 140.

In one embodiment of the present invention, the directional antenna 104 of the TCAS system 102 is configured to transmit in the L-Band. In a further embodiment, the directional antenna 104 may be configured to transmit a plurality of RF beam at 1030 MHz. Those skilled in the art should recognize that 1030 MHz is the commonly accepted interrogation frequency standard for TCAS systems. It should further be recognized that 1090 MHz represents the standardized interrogation reply frequency. As such, in order to allow for Doppler shift measurements of ground reflected signals, the TCAS system 102 may be configured to receive signals at or near the frequency of transmission. In this regard, the directional antenna 104 of the TCAS system 102 may be configured to receive RF signals within the L-band such that the receiving frequency range includes the transmission frequency of the antenna 104. For example, in the case where the transmission frequency is 1030 MHz, the TCAS system 102 may be configured to receive signals reflected from the ground at or near 1030 MHz.

It is recognized herein that the beamwidth of the antenna 104 of the TCAS system 102 is relatively wide. It is further contemplated herein that the TCAS 102 of the system 100 may be configured to filter the plurality of signals reflected from the ground utilizing a bearing of return for each of the reflected signals. In this regard, for example, reflected signals impinging on the antenna 104 of the TCAS 102 at angles larger than ±3 degrees relative to the beam centers may be rejected.

Figure 2B:
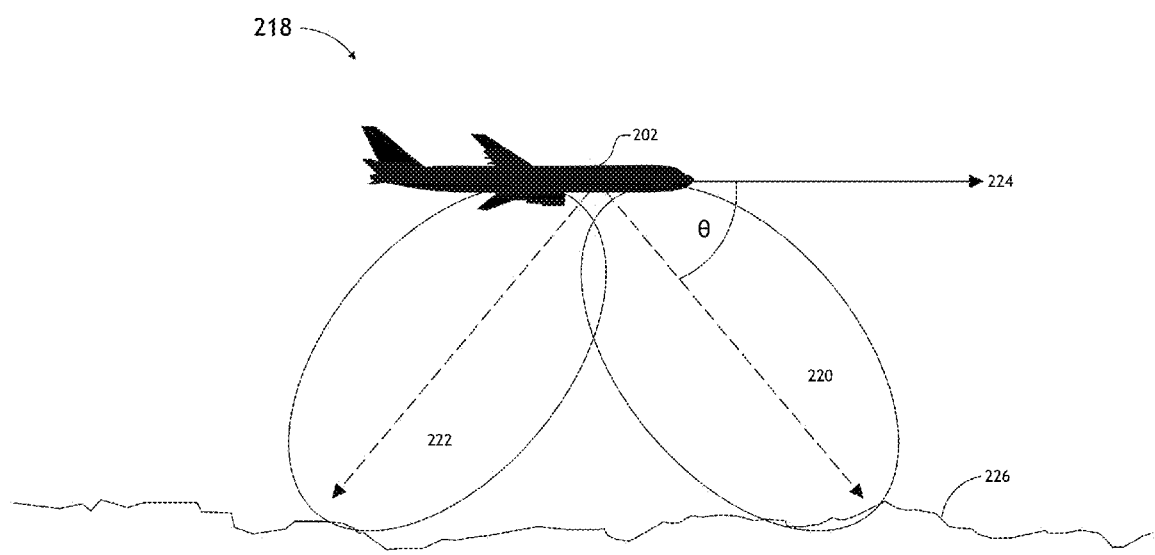
FIG. 2B illustrates a side view of a directional RF beam transmission pattern, in accordance with one embodiment of the present invention.
Figure 3:
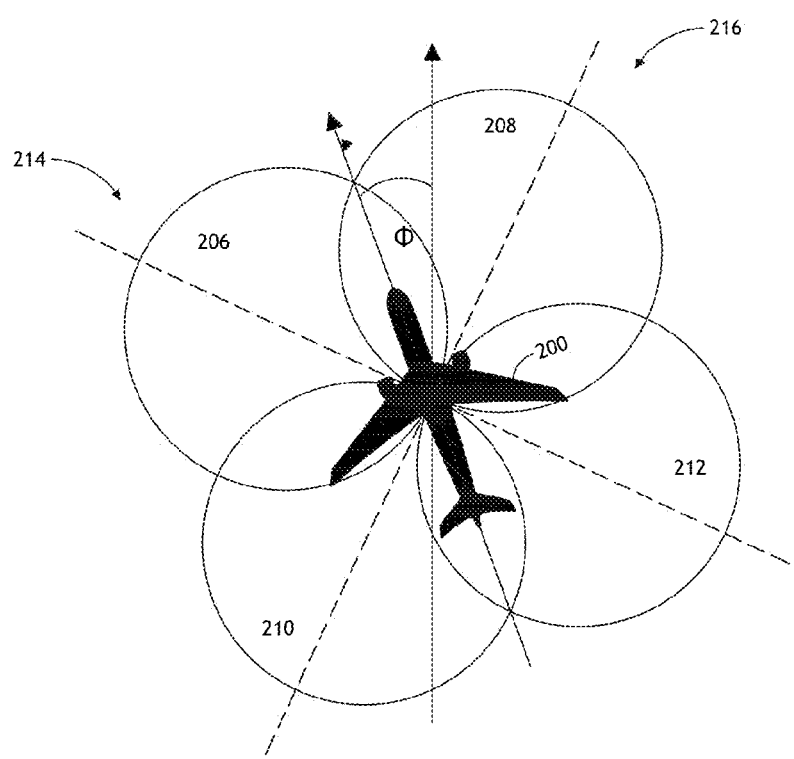
FIG. 3 illustrates a top view of a directional RF beam transmission pattern under drift angle conditions, in accordance with one embodiment of the present invention.

FIGS. 2A and 2B illustrate a transmission pattern 200 generated by the TCAS 102, in accordance with an exemplary embodiment of the present disclosure. The transmission pattern, as shown in the top view of FIG. 2A, may include at least a first RF beam 206 transmitted along a first direction 207 from the aircraft 202 toward a first region of the ground 226, a second RF beam 208 transmitted along a second direction 209 from the aircraft 202 toward a second region of the ground 226, a third RF beam 210 transmitted along a third direction 211 from the aircraft 202 toward a third region of the ground 226, and a fourth RF beam 212 transmitted along a fourth direction 213 from the aircraft 202 toward a fourth region of the ground 226.

In an additional embodiment of the present invention, the transmitted beams 206, 208, 210, and 212 may be oriented at a selected angle within the horizontal plane of the antenna 104 of the TCAS system 102 (not shown in FIG. 2A) measured relative to a center line 204 of the aircraft. Specifically, the generated transmission pattern 200 may include a first RF beam having a first angle of transmission, a second RF beam having a second angle of transmission, a third RF beam having a third angle of transmission, and a fourth RF beam having a fourth angle of transmission, the first angle of transmission, the second angle of transmission, the third angle of transmission, and the fourth angle of transmission being measured relative to a center line of the aircraft.

In an exemplary embodiment of the present invention, as shown in FIG. 2A, the transmitted beams 206, 208, 210, and 212 may be oriented at 45 degrees with respect to the center line 204 of the aircraft. The applicant notes that for the purposes of simplicity the angle of transmission within the horizontal plane of the antenna of the TCAS system 102 has been defined to range from 0 to 90 degrees and is measured in each quadrant of FIG. 2A from the center line 204. Those skilled in the art should recognize that this definition system is arbitrary and if a user so chooses the angle of transmission for each beam 206, 208, 210, or 212 may be defined with a different convention system. For instance, all angles of transmission may be measured relative to a single point (e.g., forward direction of aircraft). In this definition system, for example, the angles of transmission for beams 206, 208, 210, and 212 illustrated in FIG. 2A may correspond to 45 degrees, 135 degrees, 225 degrees, and 315 degrees respectively.

While the applicant has illustrated a transmission angle of 45 degrees, this should not be interpreted as a limitation, but merely an illustration. It is recognized that each beam 206, 208, 210, and 212 may, in a general sense, range from 0 to 90 degrees as measured from the center line 204. It is noted herein that each successive beam is rotationally separated by 90 degrees, as shown in FIG. 2A. As such, if beam 208 is oriented at 0 degrees relative to the center line 204 (0 degrees in a 360 degree convention—with nose of plane at 0 degrees and tail at 180 degrees) then beam 206 will be oriented at 90 degrees from the center line 204 (270 degrees in a 360 degree convention), beam 212 will be oriented at 90 degrees from the center line 204 (90 degrees in a 360 degree convention, and beam 210 will be oriented at 0 degrees from the center line 204 (180 degrees in a 360 degree convention). Similarly, beam 208 may be oriented at 90 degrees relative to the center line 204, requiring beam 212 to be oriented at 0 degrees from the center line 204, beam 210 to be oriented at 90 degrees from the center line 204, and beam 206 to be oriented at 0 degrees from the center line 204.

In an exemplary embodiment of the present invention, as shown in FIG. 2A, the beams 206, 208, 210, and 212 may correspond respectively to a forward-left beam 206 transmitted along a forward-left direction 207 of the aircraft 202, a forward-right beam 208 transmitted along a forward-right 209 direction of the aircraft 202, an aft-left beam 210 transmitted along an aft-left direction 211 of the aircraft 202, or an aft-right beam 212 transmitted along an aft-right direction 213 of the aircraft.

In a further embodiment of the present invention, the forward-left beam 206 and the aft-right beam 212 may define a "left" beam 214 and the forward-right beam 208 and the aft-left beam 210 may define a right beam 216. In another embodiment, the forward-left beam 206 and the forward-right beam 208 may define the forward beam 220, while the aft-left beam 210 and the aft-right beam 212 define the aft beam 222.

As shown in the side view of FIG. 2B, each of the beams may generally be directed toward the ground. For example, the forward beam 220 (including the front-left beam 206 and the front-right beam 208) and/or the aft beam 222 (including the aft-left beam 210 and the aft-right beam 212) may be oriented toward the ground at a selected look angle θ, measured relative to the line of sight 224 of the aircraft 202. It is recognized herein that the look angle θ may include a range of values. In typical settings, the look angle θ may be approximately 15 degrees. This angle value should not be interpreted as a limitation, but merely as an illustration. It is contemplated herein that the look angle θ may include any angle allowing the TCAS system 102 to operate in a Doppler configuration.

In a further aspect of the present invention, directional antenna 104 of the TCAS system 102 may be configured to receive a first RF signal reflected from the first region of the ground 226, a second RF signal reflected from the second region of the ground 226, a third RF signal reflected from the third region of the ground 226, and a fourth RF signal reflected from the fourth region of the ground 226. In this regard, the directional antenna 104 of the TCAS 102 may receive a reflected RF signal (e.g., 1030 MHz signal) generally along the direction of original transmission. For instance, beam 206 of the transmitted radiation pattern may travel along a direction 207 toward the ground. Upon reflection from the ground, the directional antenna 104 of the TCAS system 102 may receive reflected radiation travel generally along the same direction 207, but from the ground to the directional antenna 104. Due to the motion of the aircraft 202, the reflected signal will experience Doppler shifting. In a like manner, this concept may generally be applied to beams 208, 210, and 212.

In a further aspect of the present invention, the TCAS system 102 may measure the frequency difference, or Doppler shift, present in each of the beams reflected signals as measured relative to the original transmitted beams 206, 208, 210, and 212. In this manner, the TCAS system 102 may be configured to measure at least a frequency difference between the first transmitted RF beam 206 and the first reflected RF signal (corresponding to the first transmitted beam 206), a frequency difference between the second transmitted RF beam 208 and the second reflected RF signal (corresponding to the second transmitted beam 208), a frequency difference between the third transmitted RF beam 210 and the third reflected RF signal (corresponding to the third transmitted beam 210), and a frequency difference between the fourth transmitted RF beam 212 and the fourth reflected RF signal (corresponding to the fourth transmitted beam 212).

In an exemplary embodiment of the present invention, the TCAS system 102 may measure the frequency shift in the transmitted and received signals along the Front-Left direction 207, the Front-Right direction 209, the Aft-Left direction 211, and the Aft-Right direction 213. In this regard, the TCAS system 102 may measure at least one of a front-left frequency shift defined by the frequency difference between a forward-left beam transmitted along a forward-left direction of the aircraft and an RF signal reflected by the ground toward the TCAS along the forward-left direction of the aircraft, a front-right frequency shift defined by the difference between forward-right beam transmitted along a forward-right direction of the aircraft and an RF signal reflected by the ground toward the TCAS along the forward-right direction of the aircraft, an aft-left frequency shift defined by the difference between an aft-left beam transmitted along an aft-left direction of the aircraft and an RF signal reflected by the ground toward the TCAS along the aft-left direction of the aircraft, or an aft-right frequency shift defined by a frequency difference between an aft-right beam transmitted along an aft-right direction of the aircraft and an RF signal reflected by the ground toward the TCAS along the aft-right direction of the aircraft.

Measuring and comparing the Doppler shift present in each of the reflected signals corresponding to the transmitted beams 206, 208, 210, and 212 allows for the determination of a variety of characteristics related the aircraft's motion, as will be discussed in greater detail further herein.

Referring again to FIG. 1A, the one or more computing systems 108 of the system 100 may be communicatively coupled (e.g., wireline or wirelessly) and configured to receive a set of frequency shift measurements from the TCAS system 102. In addition, the one or more computing system 108 may be configured to receive a heading reference 120. Those skilled in the art should recognize that an aircraft heading reference may be provided to the TCAS 102 and stored for later retrieval. Upon receiving the set of frequency shift measurements and the heading reference 120, the one or more computing systems 108 may then execute a ground speed algorithm 116 and/or a drift angle algorithm 118.

In one embodiment of the present invention, the ground speed algorithm 114 may calculate the ground speed of the aircraft 202 utilizing the difference in frequency shifts between the plurality if beams (e.g., forward beams 206 and/or beam 208) and an aft beam 222 (e.g., beam 210 and/or 212). The frequencies received by the TCAS radio 104 for each beam are provided by:

$$f' = f + \Delta f \qquad \text{(Eq.1)}$$

where $\Delta f$ represents the Doppler shift in the ground reflected signals created by the motion of the aircraft 202. It is further recognized that in a general sense the frequency shift of a given beam is given by:

$$\Delta f = \frac{2vf}{c}\cos\theta \qquad \text{(Eq. 2)}$$

where v represents the down range component of the ground velocity of the aircraft 202, f represents the transmission frequency of the given beam, c represents the speed of light, and $\theta$ represents the looking angle, discussed previously herein.

Utilizing the above relationships, it is straightforward to note that:

$$V_{FR} = \frac{(\Delta f_{FR} - \Delta f_{AL}) \cdot c}{2 \cdot f \cdot \cos\theta} \qquad \text{(Eq. 3)}$$

where $\Delta f_{FR}$ represents the Doppler shift for the front-right beam, $\Delta f_{AL}$ represents the Doppler shift for the aft-left beam. $V_{FR}$ represents the down range component of the aircraft velocity for the front-right beam.

Similarly:

$$V_{FL} = \frac{(\Delta f_{FL} - \Delta f_{AR}) \cdot c}{2 \cdot f \cdot \cos\theta} \qquad \text{(Eq. 4)}$$

where $\Delta f_{FL}$ represents the Doppler shift for the front-left beam, $\Delta f_{AR}$ represents the Doppler shift for the aft-right beam. $V_{FL}$ represents the down range component of the aircraft velocity for the front-left beam. Note, as used throughout the present disclosure, the terms "Doppler shift," "frequency shift," and "frequency difference" have been used interchangeably.

The aircraft ground speed may then be calculated by:

$$V = \sqrt{V_{FL}^2 + V_{FR}^2} \qquad \text{(Eq.5)}$$

In another embodiment of the present invention, the drift angle algorithm 116 may calculate the drift angle $\phi$ (shown in FIG. 3) of the aircraft 202 utilizing $V_{FL}$ and $V_{FR}$ of equations 3 and 4 above. The aircraft drift angle $\phi$ may be calculated as:

$$\varphi = a\tan\left(\frac{V_{FR}}{V_{FL}}\right) - 45° \qquad \text{(Eq. 6)}$$

In a further aspect of the present invention, the computing system 108 may execute the flight parameter determination algorithm 118 in order to determine one or more parameters associated with the flight of the aircraft 202. The one or more aircraft navigation parameters may include, but are not limited to, present position of the aircraft 202, course of the aircraft 202, or distance to destination of the aircraft 202. In this regard, the flight parameter determination algorithm 118 may utilize the results generated by the ground speed algorithm 116, the drift angle algorithm 118, along with a provided heading reference 120 in order to calculate the one or more flight parameters.

In a further embodiment, the computing system 108 may transmit the various outputs described previously herein to an indication unit 122. The indication unit 122 may include, but is not limited to, a graphical display unit (e.g., cockpit display) or an audio output device (e.g., audio speaker). Moreover, it is further contemplated the computing system 108 may transmit the various outputs to one or more sub-systems of the aircraft communication systems (not shown) in order to transmit the results described above to a remote user or a remote device (e.g., air traffic control or proximate aircraft).

In a further embodiment, program instructions 112 implementing methods such as those described herein may be transmitted over or stored on carrier medium 110. The carrier medium may be a transmission medium such as a wire, cable, or wireless transmission link. The carrier medium 110 may also include a storage medium such as a read-only memory, a random access memory, a magnetic or optical disk, a magnetic tape, or the like. It should be recognized that the various steps described throughout the present disclosure may be carried out by a single computer computing system 108 or, alternatively, a multiple computer computing system 108. Moreover, different subsystems of the system 100, such as various other navigation relevant systems (e.g., GPS, inertial navigation systems, weather radar, and the like), may include a computer system suitable for carrying out at least a portion of the steps described above. Therefore, the above description should not be interpreted as a limitation on the present invention but merely an illustration. Further, the one or more computing systems 108 may be configured to perform any other step(s) of any of the method embodiments described herein.

In a further embodiment of the present invention, the TCAS 102 may be configured to provide a Barker encoded differential phase shift keying (DPSK) within at least one of the first transmitted RF beam, the second transmitted RF beam, the third transmitted RF beam, or the fourth transmitted RF beam. It is contemplated herein that the inclusion of a Barker encoded DPSK may improve the signal-to-noise ratio (SNR) of the measured signals as well as increasing correlation of return. In an even further embodiment, the TCAS is further configured to encode a signal of at least one of the first transmitted RF beam, the second transmitted RF beam, the third transmitted RF beam, or the fourth transmitted RF beam with a miscalculated cyclic redundancy code (CRC). For example, the a transmission from the TCAS 102 may be encoded as a standard Mode S interrogation, consisting of P1, P2 and P6 pulses as defined by the standard TCAS specification. In this regard, the P6 pulse contains data bits transmitted utilizing DPSK modulation. Moreover, the transmitted data bits are further protected via a CRC transmitted for purposes of error detection and correction. The inclusion of a purposefully miscalculated CRC aids in ensuring that transponders on other aircraft do not respond to the 1030 MHz transmissions of the aircraft.

Figure 4:
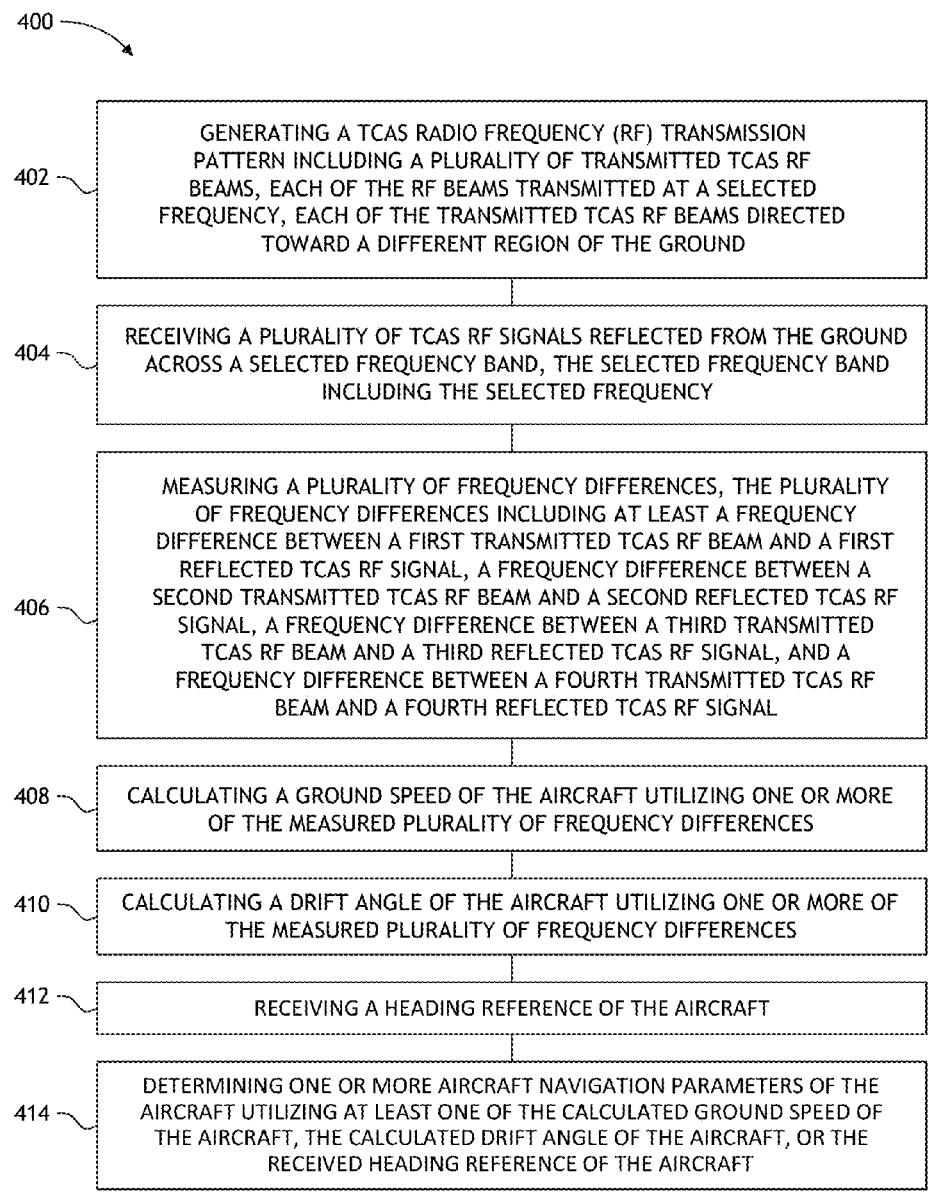
FIG. 4 is a flow diagram illustrating a method for navigation of an aircraft utilizing a traffic collision avoidance system, in accordance with one embodiment of the present invention.

FIG. 4 illustrates a process flow 400 suitable for implementation by the system 100 of the present invention. The system 100 should not, however, be interpreted as a limitation on the process flow 400 as it is anticipated that the process 400 may be carried out in an additional analogous contexts. In one aspect, it is recognized that the data processing steps of the process flow 400 may be carried out via a pre-programmed algorithm executed by one or more processors of computing system 108. Step 402 generates a TCAS radio frequency (RF) transmission pattern including a plurality of transmitted TCAS RF beams, each of the RF beams transmitted at a selected frequency, each of the transmitted TCAS RF beams directed toward a different region of the ground. For example, RF transmission pattern may include a first RF beam transmitted along a first direction toward a first region of the ground, a second RF beam transmitted along a second direction toward a second region of the ground, a third RF beam transmitted along a third direction toward a third region of the ground, and a fourth RF beam transmitted along a fourth direction toward a fourth region of the ground.

Step 404 receives a plurality of TCAS RF signals reflected from the ground across a selected frequency band, the selected frequency band including the selected frequency. For example, the plurality of reflected RF signals may include a first RF signal reflected from the first region of the ground toward the TCAS along the first direction, a second RF signal reflected from the second region of the ground toward the TCAS along the second direction, a third RF signal reflected from the third region of the ground toward the TCAS along the third direction, and a fourth RF signal reflected from the fourth region of the ground toward the TCAS along the fourth direction.

Step 406 measures a plurality of frequency differences, the plurality of frequency differences including at least a frequency difference between a first transmitted TCAS RF beam and a first reflected TCAS RF signal, a frequency difference between a second transmitted TCAS RF beam and a second reflected TCAS RF signal, a frequency difference between a third transmitted TCAS RF beam and a third reflected TCAS RF signal, and a frequency difference between a fourth transmitted TCAS RF beam and a fourth reflected TCAS RF signal.

Step 408 calculates a ground speed of the aircraft utilizing one or more of the measured plurality of frequency differences. Step 410 calculates calculating a drift angle of the aircraft utilizing one or more of the measured plurality of frequency differences. Step 412 receives a heading reference of the aircraft (e.g., may receive heading reference from any suitable source). Step 414 determines one or more aircraft navigation parameters of the aircraft utilizing at least one of the calculated ground speed of the aircraft, the calculated drift angle of the aircraft, or the received heading reference of the aircraft.

All of the methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

It is further contemplated that each of the embodiments of the method described above may include any other step(s) of any other method(s) described herein. In addition, each of the embodiments of the method described above may be performed by any of the systems described herein.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

Furthermore, it is to be understood that the invention is defined by the appended claims. Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A traffic collision avoidance system based navigation system, comprising:
    a traffic collision avoidance system (TCAS) associated with an aircraft, the TCAS including one or more directional antennas, the TCAS configured to:
        generate a radio frequency (RF) transmission pattern at a selected frequency, the transmission pattern including a plurality of RF beams, each RF beam being directed to a different region of the ground;
        receive a plurality of RF signals reflected from the ground across a selected frequency band, the selected frequency band including the selected frequency; and
        measure a plurality of frequency differences, the plurality of frequency differences including at least a frequency difference between each of the plurality of RF beams and the plurality of reflected RF signals; and
    one or more computing systems in communication with the TCAS, the one or more computing systems configured to:
        calculate a ground speed of the aircraft utilizing one or more of the measured plurality of frequency differences;
        calculate a drift angle of the aircraft utilizing one or more of the measured plurality of frequency differences;
        receive a heading reference of the aircraft; and
        determine one or more aircraft navigation parameters of the aircraft utilizing at least one of the calculated ground speed of the aircraft, the calculated drift angle of the aircraft, or the received heading reference of the aircraft.

2. The system of claim 1, wherein the plurality of RF beams of the generated transmission pattern includes at least a first RF beam having a first angle of transmission, a second RF beam having a second angle of transmission, a third RF beam having a third angle of transmission, and a fourth RF beam having a fourth angle of transmission, the first angle of transmission, the second angle of transmission, the third angle of transmission, and the fourth angle of transmission being measured relative to a center line of the aircraft.

3. The system of claim 2, wherein each of the first angle of transmission, the second angle of transmission, the third angle of transmission, and the fourth angle of transmission are oriented at substantially 45° relative to the center line of the aircraft.

4. The system of claim 1, wherein the one or more directional antennas of the TCAS are configured to transmit a plurality of RF beams at a frequency within the L-band.

5. The system of claim 4, wherein the one or more directional antennas of the TCAS are configured to transmit a plurality of RF beams at substantially 1030 MHz.

6. The system of claim 1, wherein the one or more directional antennas of the TCAS are configured to receive a plurality of RF signals reflected from the ground across a selected frequency band within the L-band, the selected frequency band including the selected frequency.

7. The system of claim 6, wherein the one or more directional antennas of the TCAS are configured to receive a plurality of RF signals reflected from the ground across a selected frequency band, the selected frequency band including a frequency of 1030 MHz.

8. A traffic collision avoidance system based navigation system, comprising:
- a traffic collision avoidance system (TCAS) associated with an aircraft, the TCAS including one or more directional antennas, the TCAS configured to:
  - generate a radio frequency (RF) transmission pattern at a selected frequency, the transmission pattern including at least a first RF beam transmitted along a first direction toward a first region of the ground, a second RF beam transmitted along a second direction toward a second region of the ground, a third RF beam transmitted along a third direction toward a third region of the ground, and a fourth RF beam transmitted along a fourth direction toward a fourth region of the ground;
  - receive a plurality of RF signals reflected from the ground across a selected frequency band, the selected frequency band including the selected frequency, the plurality of reflected RF signals including a first RF signal reflected from the first region of the ground toward the TCAS along the first direction, a second RF signal reflected from the second region of the ground toward the TCAS along the second direction, a third RF signal reflected from the third region of the ground toward the TCAS along the third direction, and a fourth RF signal reflected from the fourth region of the ground toward the TCAS along the fourth direction; and
  - measure a plurality of frequency differences, the plurality of frequency differences including at least a frequency difference between the first transmitted RF beam and the first reflected RF signal, a frequency difference between the second transmitted RF beam and the first reflected RF signal, a frequency difference between the third transmitted RF beam and the third reflected RF signal, and a frequency difference between the fourth transmitted RF beam and the fourth reflected RF signal; and
- one or more computing systems in communication with the TCAS, the one or more computing systems configured to:
  - calculate a ground speed of the aircraft utilizing one or more of the measured plurality of frequency differences;
  - calculate a drift angle of the aircraft utilizing one or more of the measured plurality of frequency differences;
  - receive a heading reference of the aircraft; and
  - determine one or more aircraft navigation parameters of the aircraft utilizing at least one of the calculated ground speed of the aircraft, the calculated drift angle of the aircraft, or the received heading reference of the aircraft.

9. The system of claim 8, wherein the generated transmission pattern includes at least a first RF beam having a first angle of transmission, a second RF beam having a second angle of transmission, a third RF beam having a third angle of transmission, and a fourth RF beam having a fourth angle of transmission, the first angle of transmission, the second angle of transmission, the third angle of transmission, and the fourth angle of transmission being measured relative to a center line of the aircraft.

10. The system of claim 9, wherein each of the first angle of transmission, the second angle of transmission, the third angle of transmission, and the fourth angle of transmission are oriented at substantially 45° relative to the center line of the aircraft.

11. The system of claim 8, wherein at least one of the plurality of frequency differences measured by the TCAS comprises:
- at least one of a front-left frequency difference defined by the frequency difference between a forward-left beam transmitted along a forward-left direction of the aircraft and an RF signal reflected by the ground toward the TCAS along the forward-left direction of the aircraft, a front-right frequency difference defined by the difference between forward-right beam transmitted along a forward-right direction of the aircraft and an RF signal reflected by the ground toward the TCAS along the forward-right direction of the aircraft, an aft-left frequency difference defined by the difference between an aft-left beam transmitted along an aft-left direction of the aircraft and an RF signal reflected by the ground toward the TCAS along the aft-left direction of the aircraft, or an aft-right frequency difference defined by a frequency difference between an aft-right beam transmitted along an aft-right direction of the aircraft and an RF signal reflected by the ground toward the TCAS along the aft-right direction of the aircraft.

12. The system of claim 11, wherein the one or more computing systems are configured to calculate the ground speed of the aircraft utilizing at least one of the front-left frequency difference, the front-right frequency difference, the aft-left frequency difference or the aft-right frequency difference.

13. The system of claim 11, wherein the one or more computing systems are configured to calculate the drift angle of the aircraft utilizing at least one of the front-left frequency difference, the front-right frequency difference, the aft-left frequency difference or the aft-right frequency difference.

14. The system of claim 8, wherein the one or more aircraft navigation parameters of the aircraft comprise:
- at least one of a present position of the aircraft, a course of the aircraft, and a distance to destination of the aircraft.

15. The system of claim 8, wherein the TCAS is configured to provide Barker encoded differential phase shift keying (DPSK) within at least one of the first transmitted RF beam, the second transmitted RF beam, the third transmitted RF beam, or the fourth transmitted RF beam.

16. The system of claim 15, wherein the TCAS is configured to encode a signal of at least one of the first transmitted RF beam, the second transmitted RF beam, the third transmitted RF beam, or the fourth transmitted RF beam with a miscalculated cyclic redundancy code (CRC).

17. The system of claim 8, wherein the TCAS is configured to filter the plurality of reflected signals utilizing a bearing of return for each of the reflect signals.

18. A method of traffic collision avoidance system (TCAS) based navigation of an aircraft, comprising:
- generating a TCAS radio frequency (RF) transmission pattern including a plurality of transmitted TCAS RF beams, each of the RF beams transmitted at a selected frequency, each of the transmitted TCAS RF beams directed toward a different region of the ground;
- receiving a plurality of TCAS RF signals reflected from the ground across a selected frequency band, the selected frequency band including the selected frequency;
- measuring a plurality of frequency differences, the plurality of frequency differences including at least a frequency difference between a first transmitted TCAS RF beam and a first reflected TCAS RF signal, a frequency difference between a second transmitted TCAS RF beam and a second reflected TCAS RF signal, a frequency difference between a third transmitted TCAS RF beam and a third reflected TCAS RF signal, and a frequency difference between a fourth transmitted TCAS RF beam and a fourth reflected TCAS RF signal;
- calculating a ground speed of the aircraft utilizing one or more of the measured plurality of frequency differences;
- calculating a drift angle of the aircraft utilizing one or more of the measured plurality of frequency differences;
- receiving a heading reference of the aircraft; and
- determining one or more aircraft navigation parameters of the aircraft utilizing at least one of the calculated ground speed of the aircraft, the calculated drift angle of the aircraft, or the received heading reference of the aircraft.

19. The method of claim 18, wherein the generating a TCAS radio frequency (RF) transmission pattern including a plurality of transmitted TCAS RF beams comprises:
- generating a TCAS RF transmission pattern including at least a first TCAS RF beam transmitted along a first direction toward a first region of the ground, a second TCAS RF beam transmitted along a second direction toward a second region of the ground, a third TCAS RF beam transmitted along a third direction toward a third region of the ground, and a fourth TCAS RF beam transmitted along a fourth direction toward a fourth region of the ground.

20. The method of claim 18, wherein the receiving a plurality of TCAS RF signals reflected from the ground comprises:
- receiving at least a first TCAS RF signal reflected from a first region of the ground along a first direction, a second TCAS RF signal reflected from a second region of the ground along a second direction, a third RF signal reflected from a third region of the ground toward along a third direction, and a fourth RF signal reflected from a fourth region of the ground along a fourth direction.

21. The method of claim 18, wherein the measuring a plurality of frequency differences comprises:
- measuring at least one of a front-left frequency difference defined by a frequency difference between a forward-left beam transmitted along a forward-left direction of the aircraft and an RF signal reflected by the ground toward along the forward-left direction of the aircraft, a front-right frequency difference defined by a difference between a forward-right beam transmitted along a forward-right direction of the aircraft and an RF signal reflected by the ground along the forward-right direction of the aircraft, an aft-left frequency difference defined by a difference between an aft-left beam transmitted along an aft-left direction of the aircraft and an RF signal reflected by the ground along the aft-left direction of the aircraft, or an aft-right frequency difference defined by a frequency difference between an aft-right beam transmitted along an aft-right direction of the aircraft and an RF signal reflected by the ground along the aft-right direction of the aircraft.

* * * * *